United States Patent
Piper et al.

(10) Patent No.: US 7,058,854 B2
(45) Date of Patent: Jun. 6, 2006

(54) AUTOMODE SELECT

(75) Inventors: Stephen Piper, McDonough, GA (US); Matthew Trembley, Grayson, GA (US); Dennis Craton, Douglasville, GA (US)

(73) Assignee: LSI Logic Corporation, Milpitas, CA (US)

( * ) Notice: Subject to any disclaimer, the term of this patent is extended or adjusted under 35 U.S.C. 154(b) by 607 days.

(21) Appl. No.: 10/228,559

(22) Filed: Aug. 27, 2002

(65) Prior Publication Data

US 2004/0044925 A1    Mar. 4, 2004

(51) Int. Cl.
*G06F 11/00*    (2006.01)
(52) U.S. Cl. ............. 714/21; 714/23; 714/51; 711/154; 713/2
(58) Field of Classification Search ............ 714/21–25, 714/51, 55, 53; 711/154; 713/2
See application file for complete search history.

(56) References Cited

U.S. PATENT DOCUMENTS

| | | | | |
|---|---|---|---|---|
| 4,809,280 A | * | 2/1989 | Shonaka | 714/55 |
| 5,379,378 A | * | 1/1995 | Peters et al. | 710/105 |
| 5,432,927 A | * | 7/1995 | Grote et al. | 713/2 |
| 5,652,836 A | * | 7/1997 | Park | 714/55 |
| 6,065,053 A | * | 5/2000 | Nouri et al. | 709/224 |
| 6,341,239 B1 | * | 1/2002 | Hayashi et al. | 700/79 |
| 6,418,539 B1 | * | 7/2002 | Walker | 714/5 |
| 6,449,732 B1 | * | 9/2002 | Rasmussen et al. | 714/12 |
| 6,792,527 B1 | * | 9/2004 | Allegrucci | 713/1 |
| 6,839,788 B1 | * | 1/2005 | Pecone | 710/305 |

* cited by examiner

*Primary Examiner*—Robert Beausoliel
*Assistant Examiner*—Emerson Puente
(74) *Attorney, Agent, or Firm*—Suiter-West-Swantz PC LLO

(57) ABSTRACT

A microprocessor based system automatically detects the occurrence of certain conditions in the microprocessor. The conditions may include a determination of data corruption in the microprocessor. If a determination is made that data is corrupted, the microprocessor may be reloaded from a non-volatile memory. During a reload, a microcontroller controls the microprocessor. The non-volatile memory may be a flash memory or non-volatile random access memory.

8 Claims, 3 Drawing Sheets

AUTOMODE SELECT

FIELD OF THE INVENTION

The present invention generally relates to the field of microprocessor operations, and particularly to automatic data corruption verification for a microprocessor based system.

BACKGROUND OF THE INVENTION

Current microprocessor based systems conventionally are coupled with a non-volatile memory that provides the operating code for the microprocessor. Data in the non-volatile memory may become corrupted. Current corrective methods require manual changes to the circuit board, such as the changing of resistors or jumpers, to reconfigure the system to correct the data corruption. After the hardware changes are made, the system must be rebooted so that the microprocessor may be reloaded with the correct code and data. Also, in current corrective methods, data corruption in the firmware of the non-volatile memory may not be immediately noticed by a user. This lack of noticeability may waste much time and effort from lost performance and troubleshooting to find the problem.

Therefore, it would be desirable to provide a microprocessor based system that automatically detects data corruption in a microprocessor.

SUMMARY OF THE INVENTION

Accordingly, the present invention is directed to a method and system for automatically identifying invalid data in a microprocessor.

In the present invention, a method for verifying data validity in a microprocessor includes the steps of determining data validity in a microprocessor, and if microprocessor data is determined to be invalid, then changing an operational mode of the microprocessor.

In an embodiment of the present invention, a method for automatically verifying the validity of data from a microprocessor comprises the steps of waiting for a local reset signal to become inactive; when the local reset signal becomes inactive, determining if a memory valid signal is active; and if the memory valid signal is not active at the time of determination, then resetting the microprocessor to a different operational mode.

In an embodiment of the present invention, a system for automatically detecting data corruption in a microprocessor comprises a microprocessor that normally operates in a first mode; a non-volatile memory coupled to the microprocessor; and a microcontroller coupled to the microprocessor, the microcontroller putting the microprocessor in a second mode upon the occurrence of a microprocessor invalid data condition sensed by the microcontroller.

In an embodiment of the present invention, automatic reset and mode settings occur based on the automatic detection of data invalidity in the firmware. If the microprocessor has corrupted data, self correction may be attempted as well as identification of the underlying problem to a user. Furthermore, the user does not have to manipulate jumper wires and resistors to reload a microprocessor from a memory. Identification of data corruption may be accomplished in a user friendly manner, such as by using light emitting diodes, sound, e mail, or the like as indicators.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to automatically verifying the validity of data and code in a microprocessor in a state machine or the like. The microprocessor is loaded from a non-volatile memory (i.e., firmware such as non-volatile random access memory or flash). Any fault state recovery is managed by a microcontroller coupled to the microprocessor. If the current state machine detects invalid data, the microprocessor is reset to another mode. After being reset to another mode, the firmware of the microprocessor may be automatically loaded from a backup read only memory (ROM) or from an off board device.

Figure 1:
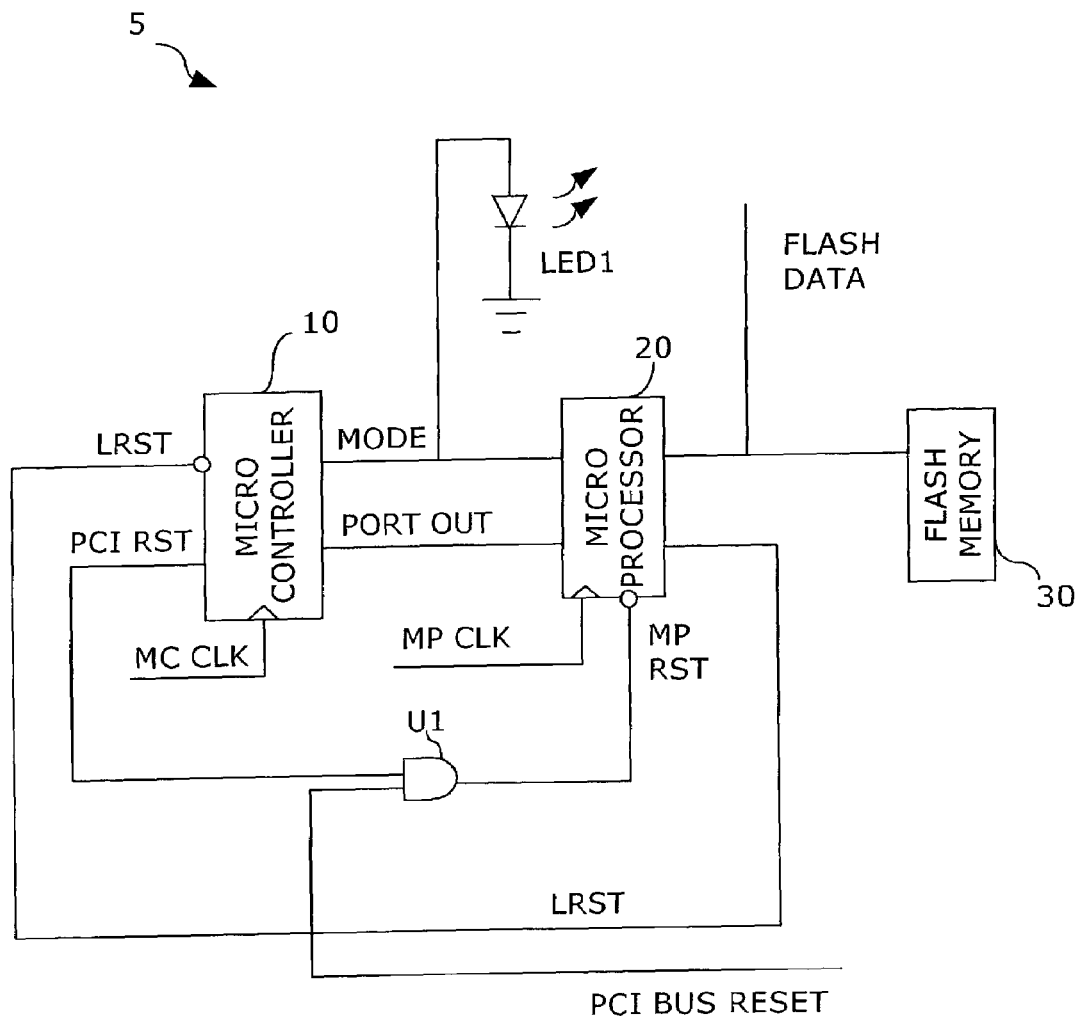
FIG. 1 illustrates an exemplary system that uses the method of the present invention.

FIG. 1 illustrates an exemplary microprocessor based circuit configuration having a detection mechanism 5 for corrupt data of the present invention. A microprocessor 20 is coupled to a microcontroller 10 and a non-volatile memory 30, such as a flash memory or a non-volatile random access memory. The microprocessor 20 may have an interface to a peripheral component interconnect (PCI) or other bus. The function of the microcontroller in an embodiment of the present invention 5 is to respond to microprocessor conditions and select the operational mode of the microprocessor. Preferably, the microcontroller 10 has a clock, MCCLK, which is independent of the clock, MPCLK, of the microprocessor 20. Microcontroller clock, MCCLK, may be an arbitrary clock, while microprocessor clock, MPCLK, may be a clock from the PCI bus. For example, the microcontroller clock, MCCLK, may be a 4 MHz to 40 MHz clock signal that originates from a resonator or crystal oscillator. A general purpose input/output (GPIO) pin of the microprocessor is used to signal valid data in the microprocessor. The GPIO pin may default to a low logic level through a pull down resistor. For example, if the microprocessor firmware is running, the microprocessor firmware validates itself and asserts the GPIO signal (i.e., raises the voltage level on the pin to a logic high value).

The microprocessor 20 is controlled by two signals generated by microcontroller 10: (1) an on board reset signal (PCIRST) and (2) a mode signal (MODE). The PCI bus reset and the on board reset signal (PCIRST) are gated together to provide microprocessor reset signal (MPRST). PCIRST is the signal from the microcontroller to reset the microprocessor if a corrupt flash (i.e., invalid data) has been detected. The PCI bus reset may be a reset signal that originates from a bus, such as a PCI bus. It may be controlled by a motherboard chipset that controls the reset of all the PCI cards. The PCI reset signal (PCIRST) is initially a high voltage value.

Microprocessor mode setting is accomplished by the use of a mode signal (MODE) as well as microprocessor reset signal (MPRST). There are two states of the mode signal: (1) MODE 3 (normal operation) and (2) MODE 0 (dedicated to placing the microprocessor in a reload state). On power up, the microprocessor 20 is reset via signal (MPRST). When the reset from the PCI bus (PCI BUS RESET) is released, the microprocessor 20 is no longer in reset mode. The microcontroller 10 then boots up the microprocessor 20 in normal mode (MODE 3). While in MODE 3, the microprocessor 20 attempts to fetch code from the non-volatile memory. If the microprocessor 20 does not assert the GPIO pin within a specified time, then the microcontroller 10 changes the mode of the microprocessor (i.e., MODE 0). A reason that the GPIO pin is not asserted is that the microprocessor 20 holds invalid data. If the mode is not changed before (MPRST) becomes inactive, the PCI card may hang up the computer. When the mode is changed to a logic high value to indicate an invalid data state (MODE=0), an indicator light emitting diode LED1 driven by this signal becomes lit to notify the user of the invalid data state. Release from the MODE 0 state may be achieved through the GPIO pin of microprocessor 20.

An exemplary operational description of the microprocessor is provided immediately below.

---

/    MICROPROCESSOR PROCESSING    /
MP MODE process:
Begin
    PORTOUT = low;
    Loop
        If MPRST = low,
            Then PORTOUT = low
                LRST = low
        If MP data is invalid and MPRST = high,
            Then PORTOUT = low
                LRST = high
        If MP data is valid and MPRST = high,
            Then PORTOUT = high
                LRST = low
        If MPRST = rising edge and MODE = 3,
            Then disable interrupts
                Load from non-volatile memory
                Enable interrupts
        If MODE = 0 and MPRST = high,
            Then MP does not execute or fetch code
    End Loop
END MP MODE process

---

Figure 2:
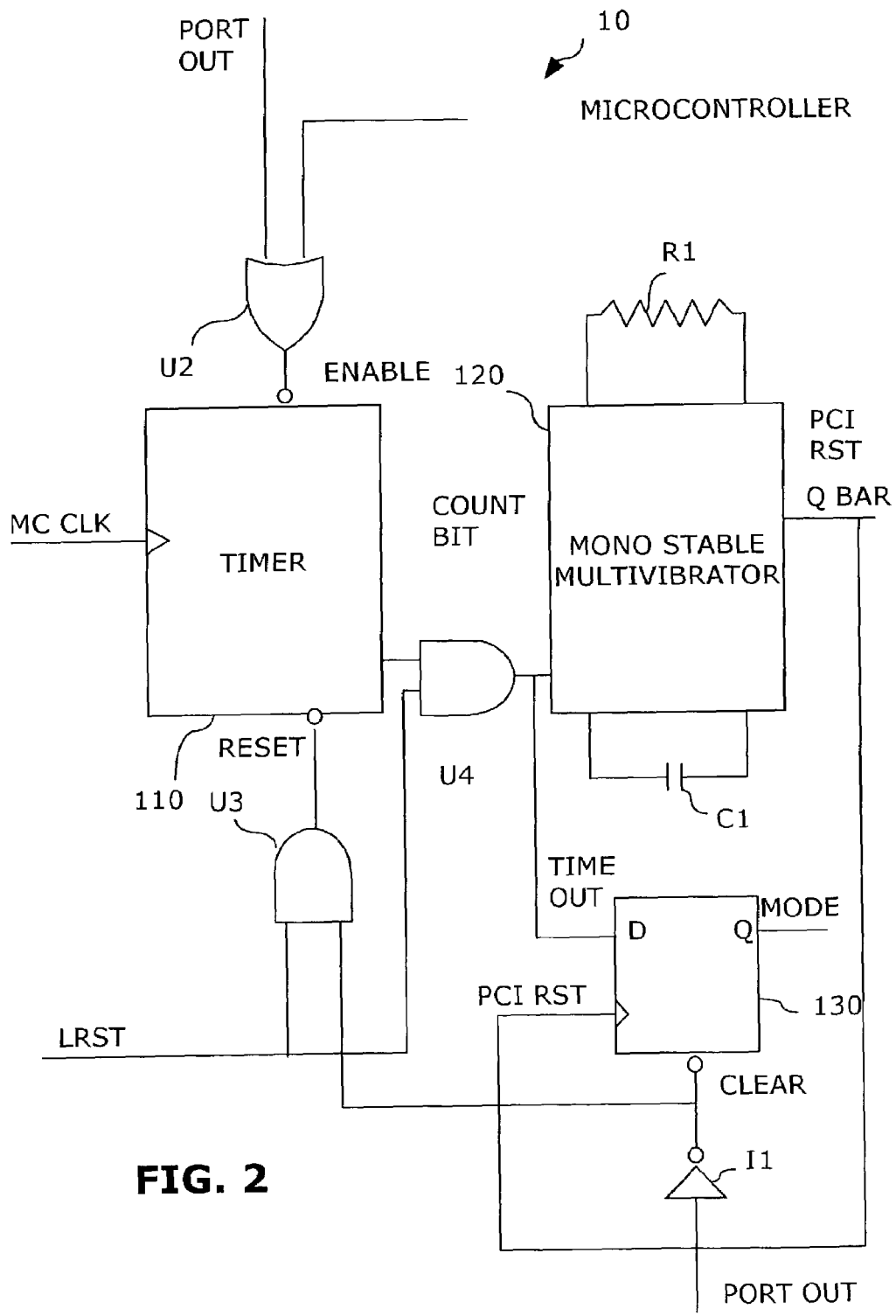
FIG. 2 illustrates an exemplary implementation of a microcontroller used in an exemplary system of the present invention.

FIG. 2 illustrates an exemplary hardware implementation for the microcontroller 10. The microcontroller 10 includes a timer 110, a pulse generator 120, a latch 130, and associated glue logic. In the exemplary embodiment, a timer 110 is represented as a counter having an enable pin and a reset pin. The timer's count threshold may be a single count bit or may be a combination of count bits which are gated, through Boolean logic, to provide a signal corresponding to a given timer count value or threshold.

The enable of the timer 110 is controlled by the GPIO pin signal (PORTOUT) from the microprocessor and the timer's count threshold. When the microprocessor GPIO pin is a low value and the timer has been powered up or reset, the timer is enabled. Upon each rising or falling edge of the clock signal MCCLK, the timer increments. When the timer reaches a predetermined threshold value, an input to gate U2 goes high, causing the timer enable to be deactivated.

In operation, the firmware of the microprocessor may run a CRC (cyclic redundancy code) check on itself. If the CRC is verified, the microprocessor drives the GPIO pin to a logic high value; i.e., PORTOUT becomes a logic value one. If the microprocessor firmware CRC were bad or unable to execute, the signal PORTOUT would never get asserted to a high logic level.

The timer threshold value triggers the pulse generator 120 (e.g., a monostable multivibrator), 120 to provide signal PCIRST. The pulse generator is controlled by a local reset signal, LRST, propagated by the microprocessor 20 in response to a microprocessor reset signal (MPRST). A logic high value for the local reset signal, LRST, enables the monostable multivibrator 120 to be triggered to provide an output pulse at Q BAR, PCIRST. The duration of the output pulse may be determined by the RC time product of an external resistor R1 and a capacitor C1. This RC time product may be set for a value such as two milliseconds or other suitable time period to ensure the microprocessor 20 resets. The TIMEOUT signal may be latched by latch 130 to provide the mode signal MODE 0. During MODE 0, the non-volatile memory may be loaded (e.g., flashed). The latching occurs during the rising edge of the clock pulse from PCIRST, a delayed response of the signal TIMEOUT. If GPIO is asserted (PORTOUT=logic high), then latch 130 and timer 110 (through gate U3) are both cleared, causing MODE to indicate normal operation (MODE 3). The timer may be reset by the local reset (LRST). Other variations of the microcontroller are contemplated by the present invention, including hardware, software, and combinations of hardware and software, as well as implementations with negative logic.

Microcontroller processing may be operationally described as follows:

---

/    MICROCONTROLLER PROCESSING    /
MC PROCESS:
Begin
    PCIRST = high;
    MODE = 3;
    Initialize TIMECOUNT;
    Loop
        If TIMECOUNT ≧ Threshold,
            Then MODE = 0
                Pulse PCIRST low for a predetermined period of time;
        If LRST = high, PORTOUT = low, and TIMEOUT < Threshold,
            Then increment or decrement TIMECOUNT
        If LRST = low or PORTOUT = high,
            Then reset TIMECOUNT
        If LRST = high and PORTOUT = high
            Then MODE = 3
    End Loop
END MC PROCESS

---

Figure 3:
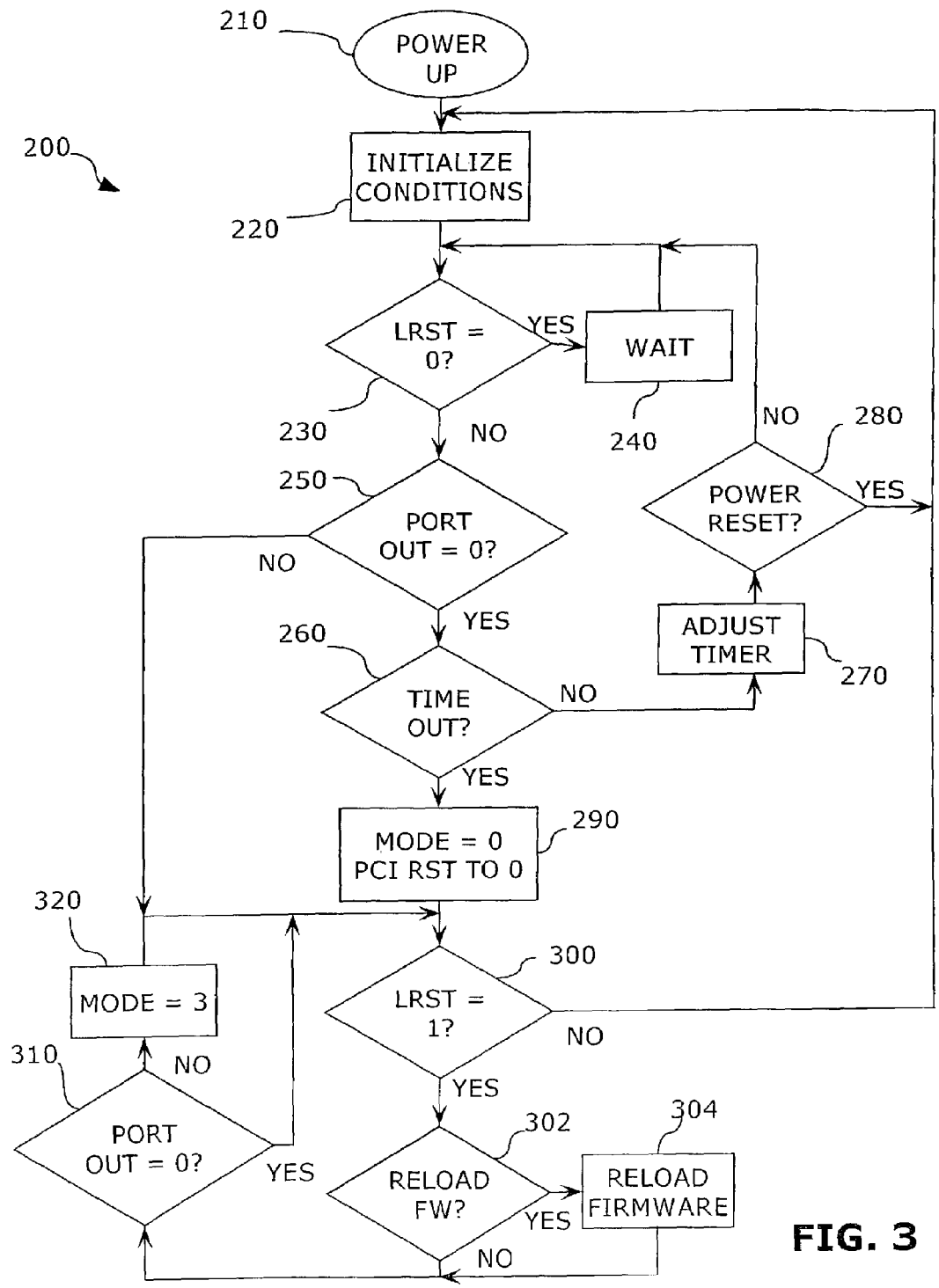
FIG. 3 illustrates a method for determining microprocessor data corruption in an embodiment of the present invention.

FIG. 3 illustrates an exemplary embodiment of the automode select method 200 of the present invention. Variables, such as MODE and PCIRST, are initialized, per step 220, on power up, step 210. During initialization, MODE may be set equal to 3 and PCIRST may be set equal to 1. A determination is made as to whether the local reset, LRST, remains active (e.g., as here, at a low voltage value), as per step 230. While LRST remains active, processing enters a wait mode (240). When LRST becomes inactive (e.g., attains a high voltage value), a determination is made as to whether the microprocessor has asserted a general purpose input/output (GPIO) pin (250). The GPIO pin corresponds to signal PORTOUT that is provided to the microcontroller. If the GPIO pin is not asserted, then a determination is made as to whether a predetermined period of time for assertion has expired (260). If the predetermined period of time has not expired, then the timer is adjusted up or down to reflect a count up or count down (270). Step 270 has been provided to show that a wait period may be incorporated in the loop, as well as represent adjusting the time value of a timer through a count sequence. Adjusting the timer (270) is an optional step for the method of the present invention. When the time value reaches a preset threshold, a time out occurs. A determination is also made as to whether a power reset has occurred, per step 280. If no power reset has occurred, then processing continues (230). Otherwise, processing proceeds (220). If the predetermined period of time has expired (260), then MODE is set to 0 and the PCI reset signal, PCIRST, is pulsed to zero. For example, PCIRST may be pulsed low for a set time such as 2 milliseconds to ensure the microprocessor resets. Processing proceeds (300). Also, if the GPIO pin is asserted in step 250, processing proceeds to step 300. The local reset signal (LRST) is compared to determine if the local reset is active (e.g., a low voltage signal). If LRST is active, processing proceeds to step 220. Optional steps 302 and 304 permit firmware to be reloaded. If LRST is not active, the GPIO pin voltage is compared, per step 310. If the GPIO pin is asserted, then MODE is set to 3 and processing proceeds to step 300. If the GPIO pin is not asserted, processing proceeds immediately to step 300. The firmware in the non-volatile memory (e.g., flash or non-volatile random access memory) may be reloaded anytime during the loop (e.g., between steps 300 and 310). The firmware reloading may be automatic (through a driver) or manual (through a user). The GPIO pin may be asserted manually by setting registers in microprocessor 20.

Variations of the present invention are contemplated. Variations include implementation for a PCIX bus, or the like. The microcontroller may be implemented through a programmable logic device, such as a field programmable gate array, or through extremely high speed logic gates. The present invention may be practiced with an Intel or other microprocessor.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for automatically detecting data corruption in a microprocessor, comprising the steps of:
    detecting a reset signal provided by the microprocessor to become inactive; and
    when the local reset signal becomes inactive, determining if a memory valid signal is active; and
    if the memory valid signal is not active at the time of determination, then resetting the microprocessor to a different operational mode.

2. The method of claim 1, wherein the step of resetting the microprocessor further comprises the step of determining if a predetermined period of time has expired before resetting the microprocessor.

3. The method of claim 2, wherein, if the predetermined period of time has expired, then loading the microprocessor from a non-volatile memory.

4. The method of claim 2, wherein, if the predetermined period of time has expired, then providing a bus reset pulse.

5. The method of claim 4, wherein the bus reset pulse is a peripheral component interconnect (PCI) bus reset pulse.

6. The method of claim 1, wherein the reset signal deactivates a microcontroller timer.

7. The method of claim 6, wherein a non-volatile memory is coupled to the microprocessor.

8. The method of claim 7, wherein the non-volatile memory is a flash memory.

* * * * *